United States Patent
Krishnamurthy et al.

(10) Patent No.: US 6,421,676 B1
(45) Date of Patent: Jul. 16, 2002

(54) SCHEDULER FOR USE IN A SCALABLE, DISTRIBUTED, ASYNCHRONOUS DATA COLLECTION MECHANISM

(75) Inventors: Raghavendra Krishnamurthy; Michael Mallo, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/345,628

(22) Filed: Jun. 30, 1999

(51) Int. Cl.$^7$ .............................................. G06F 17/30
(52) U.S. Cl. ...................... 707/102; 709/232; 709/102; 709/201
(58) Field of Search ................................. 709/102, 103, 709/106, 201, 205, 206, 217–220, 223, 224, 225, 229, 310, 313, 319; 707/102; 712/28, 25, 201, 245

(56) References Cited

U.S. PATENT DOCUMENTS

| | | | | |
|---|---|---|---|---|
| 4,232,295 A | * | 11/1980 | McConnell | 340/152 |
| 5,455,948 A | * | 10/1995 | Poole et al. | 395/650 |
| 5,778,350 A | * | 7/1998 | Adams et al. | 707/1 |
| 5,943,621 A | * | 8/1999 | Ho et al. | 455/456 |
| 6,195,628 B1 | * | 2/2001 | Blaauw et al. | 703/16 |
| 6,282,175 B1 | * | 8/2001 | Steele et al. | 370/254 |

* cited by examiner

Primary Examiner—Thomas Black
Assistant Examiner—Apu M Mofiz
(74) Attorney, Agent, or Firm—Marilyn Smith Dawkins; Bracewell & Patterson, L.L.P.

(57) ABSTRACT

Scheduling in a distributed data collection process is performed locally, within collectors. Scheduling of data transfers from endpoints or downstream collectors or to upstream collectors is based on local queues, without global management. Additionally, scheduling for the collector input queue, which manages data collection from endpoints or downstream collectors, is bifurcated from scheduling for the output queue, which manages notifications to upstream collector(s) regarding the availability of collection data for pickup. Such bifurcation permits simpler scheduling logic and different functional responses to similar events, and further localizes scheduling. Scheduling of collection data transfer is controlled, within parameters specified by the output scheduler for the endpoint or downstream collector, by the input queue for the upstream collector. Scheduling is thus based primarily on the portion of the data transfer mechanism mostly likely to comprise a bottle-neck, the upstream collector, but accommodates large numbers of fully parallel data generation endpoints as well as nondeterministic endpoint availability.

30 Claims, 8 Drawing Sheets

SCHEDULER FOR USE IN A SCALABLE, DISTRIBUTED, ASYNCHRONOUS DATA COLLECTION MECHANISM

RELATED APPLICATIONS

The present invention is related to the subject matter of the following commonly assigned, copending United States patent applications: Ser. No. 09/345,626 entitled "A SCALABLE, DISTRIBUTED, ASYNCHRONOUS DATA COLLECTION MECHANISM" and filed, Jun. 30, 1999; and Ser. No. 09/345,627 entitled "A DATA COLLECTOR FOR USE IN A SCALABLE, DISTRIBUTED, ASYNCHRONOUS DATA COLLECTION MECHANISM" and filed, Jun. 30, 1999. The content of the above-identified applications is incorporated herein by reference.

BACKGROUND OF THE INVENTION

1. Technical Field

The present invention generally relates to scheduling for distributed data collection processes and in particular to scheduling for a distributed data collection process involving a large number of data generation nodes. Still more particularly, the present invention relates to scheduling for distributed data collection through localized scheduling and bifurcation of the input and output scheduling processes.

2. Description of the Related Art

Distributed applications which operate across a plurality of systems frequently require collection of data from the member systems. A distributed inventory management application, for example, must periodically collect inventory data for compilation from constituent systems tracking local inventory in order to accurately serve inventory requests.

Large deployments of distributed applications may include very large numbers of systems (e.g., than 10,000) generating data. Even if the amount of data collected from each system is relatively small, this may result in large return data flows, consuming substantial bandwidth and time. Keeping all data generation nodes available for data collection throughout the distributed collection mechanism would be extremely wasteful of resources. However, scheduling collection from each data generation node presents a daunting problem with a large number of nodes.

The scheduling problem for distributed data collection among large numbers of nodes is further complicated when nodes are not always available, but only have intermittent or irregular periods of availability, which is likely to occur in data collection for certain information types such inventory or retail customer point-of-sale data. Nodes from which data must be collected may be mobile systems or systems which may be shut down by the user. As a result, certain nodes may not be accessible in a deterministic manner.

It would be desirable, therefore, to provide a scheduler for a distributed data collection process which is capable of handling large numbers of data generation nodes while accommodating nondeterministic node availability.

SUMMARY OF THE INVENTION

It is therefore one object of the present invention to provide improved scheduling for distributed data collection processes.

It is another object of the present invention to provide scheduling for a distributed data collection process involving a large number of data generation nodes.

It is yet another object of the present invention to provide scheduling for distributed data collection through localized scheduling and bifurcation of the input and output scheduling processes.

The foregoing objects are achieved as is now described. Scheduling in a distributed data collection process is performed locally, within collectors. Scheduling of data transfers from endpoints or downstream collectors or to upstream collectors is based on local queues, without global management. Additionally, scheduling for the collector input queue, which manages data collection from endpoints or downstream collectors, is bifurcated from scheduling for the output queue, which manages notifications to upstream collector(s) regarding the availability of collection data for pickup. Such bifurcation permits simpler scheduling logic and different functional responses to similar events, and further localizes scheduling. Scheduling of collection data transfer is controlled, within parameters specified by the output scheduler for the endpoint or downstream collector, by the input queue for the upstream collector. Scheduling is thus based primarily on the portion of the data transfer mechanism mostly likely to comprise a bottle-neck, the upstream collector, but accommodates large numbers of fully parallel data generation endpoints as well as nondeterministic endpoint availability.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
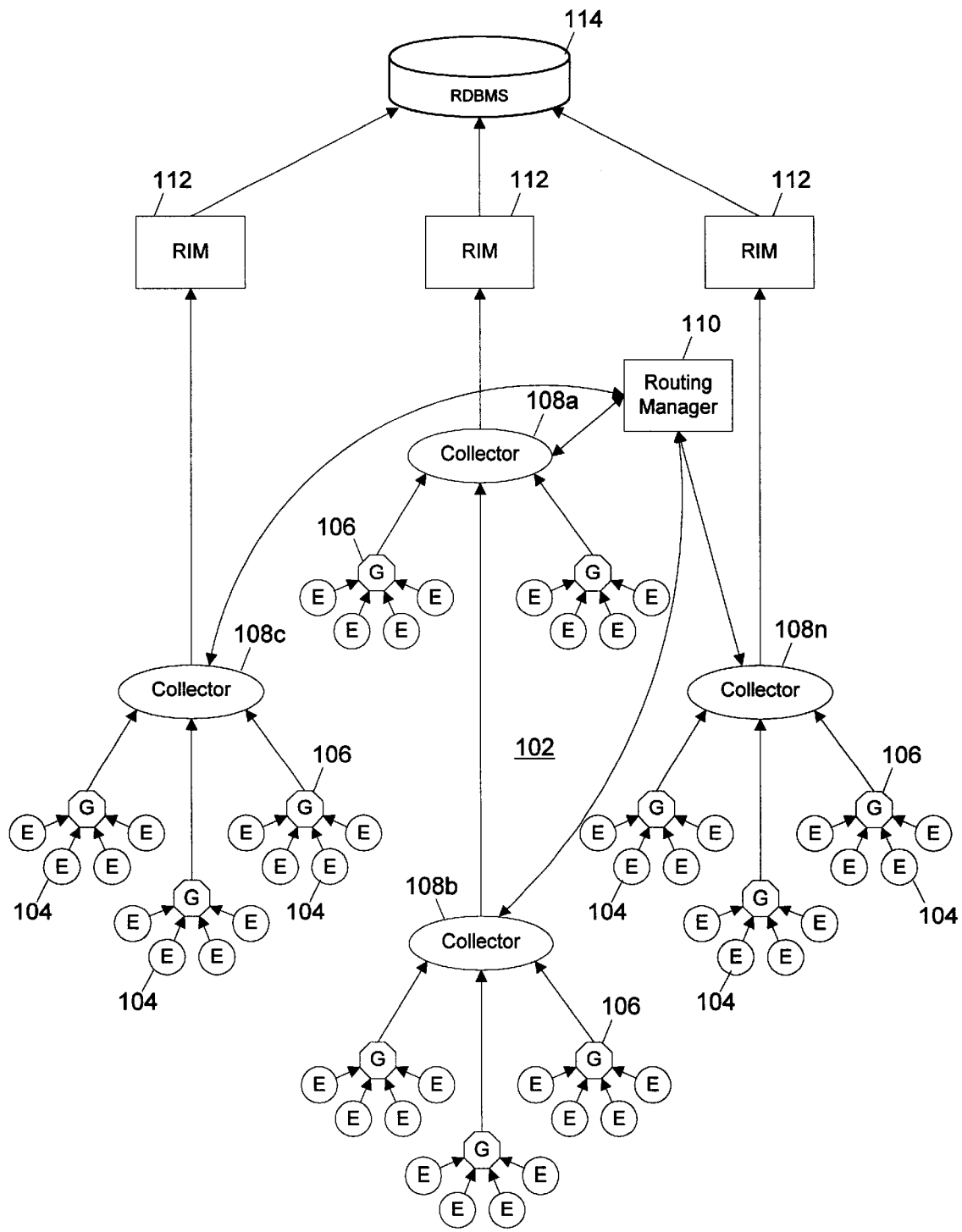
FIGS. 1A–1B depict diagrams of a distributed data collection mechanism in accordance with a preferred embodiment of the present invention.
Figure 1B:
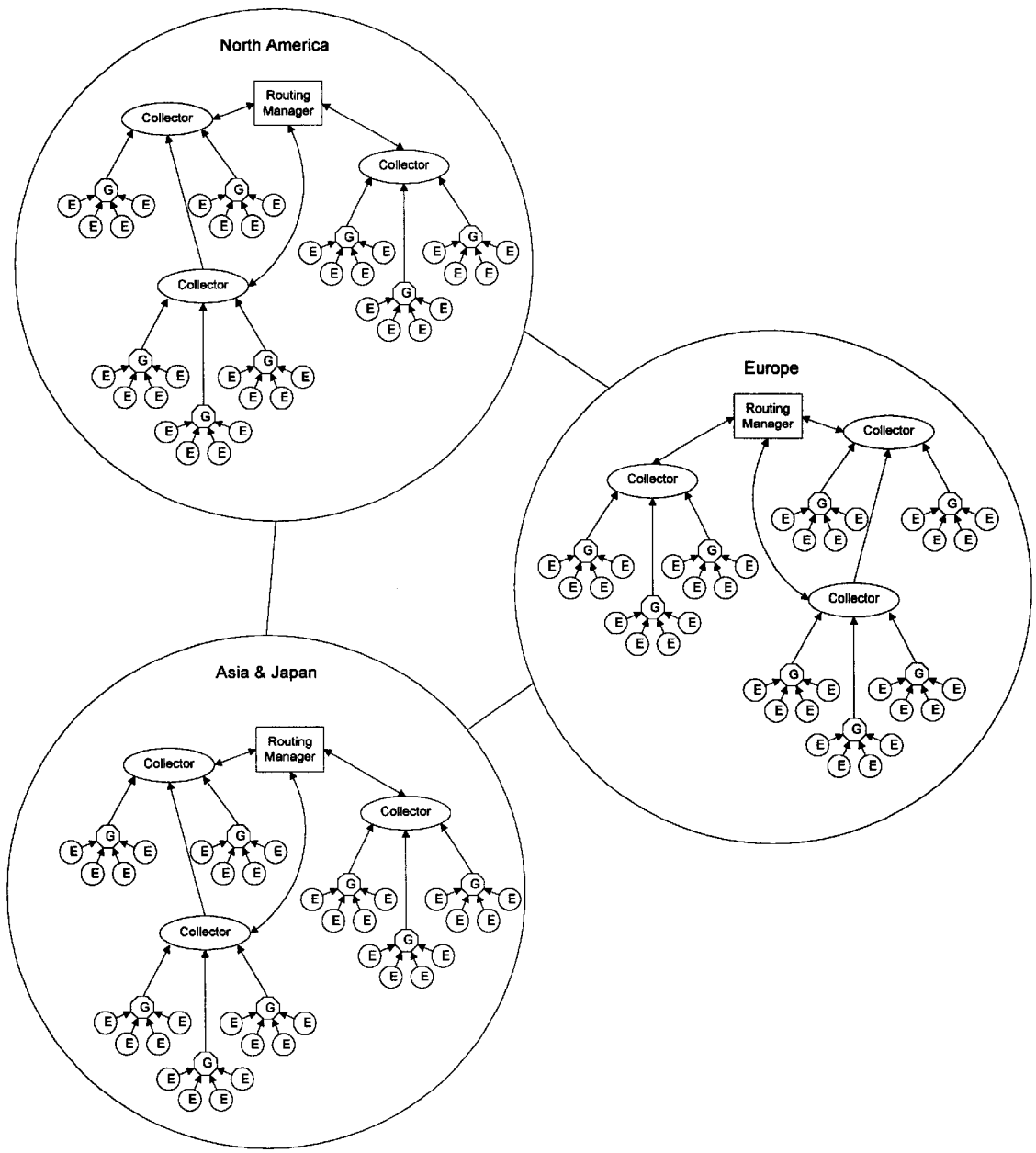

With reference now to the figures, and in particular with reference to FIGS. 1A and 1B, diagrams of a distributed data collection mechanism in accordance with a preferred embodiment of the present invention are depicted. Distributed data collection mechanism 102 is implemented within a network of data processing systems including endpoints ("E") 104 coupled via gateways ("G") 106 to collectors 108a–108n.

The network of data processing systems in which distributed data collection mechanism 102 is implemented may be either homogeneous or heterogeneous, and may form a local area network (LAN) or include two or more LANs connected to form a wide area network (WAN) or global area network. The network of data processing systems preferably includes an environment for running distributed applications, such as Tivoli Management Environment (TME) available from Tivoli Systems, Inc. of Austin, Tex.

Endpoints 104, which may also be referred to as "sources," are the systems from which data is to be collected. Gateways 106 are systems which facilitate communications between endpoints 104 and collectors 108a–108n and/or routing manager 110. Recipients are objects or processes that receive collected data, and may be collectors 108a–108n or relational interface modules ("RIMs") 112.

Collectors 108a–108n are objects or processes which perform the task of data collection from a fixed set of endpoints 104. The primary objective for collectors 108a–108n is to collect data from all corresponding endpoints 104 assigned to route data to the respective collector 108a–108n, and store the received data in a persistent depot until another collector or the ultimate recipient is ready to receive the collected data. Data is collected based on certain characteristics such as priority, availability of the source (endpoint 104 or collector 108a–108n), and bandwidth usage. A collector 108a–108n may collect data from endpoints 104 or from another collector (e.g., collectors 108a and 108n in the example depicted). A collector 108a–108n may transfer data to another collector or to the recipient of the collection.

Routing manager 110 is a centralized module which manages collectors 108a–108n and the routes from endpoints 104 through collectors 108a–108n to the recipients of the collection, relational interface modules ("RIMs") 112 and relational database management system ("RDBMS") 114. The primary function of routing manager 110 is to manage the deployment of collectors 108a–108n and maintain the routes from endpoints 104 through collectors 108a–108n to the recipients of the collection. Each routing manager 110 will service several collectors 108a–108n, although for scalability an enterprise may include several routing managers 110. FIG. 1B illustrates one circumstance under which multiple routing managers would be desirable: where the data collection includes networks spanning multiple continents.

Collectors 108a–108n, routing manager 110, RIMs 112 and RDBMS 114 may all run on a single system or may be distributed among a plurality of systems. Although the exemplary embodiment depicts a one-to-one correspondence between collectors 108a–108n and RIMs 112, multiple collectors 108a–108n may be coupled to a single RIM 112, and a single collector 108a–108n may be coupled to multiple RIMs 112 for separate databases. Endpoints 104 may be continuously coupled to the network hosting distributed data collection mechanism 102, or they may be mobile systems only occasionally connected to the network. Endpoints 104 may be continuously powered on or may have periods during which they are turned off.

Figure 2A:
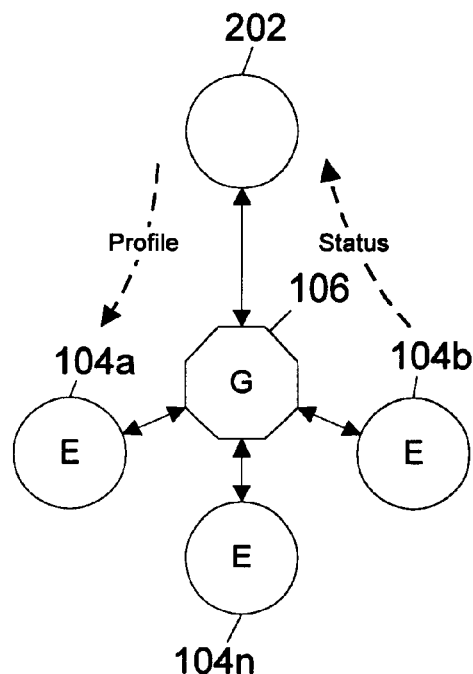
FIGS. 2A–2B are diagrams of portions of the distributed data collection mechanism relevant to different phases of the data collection process in accordance with a preferred embodiment of the present invention.
Figure 2B:
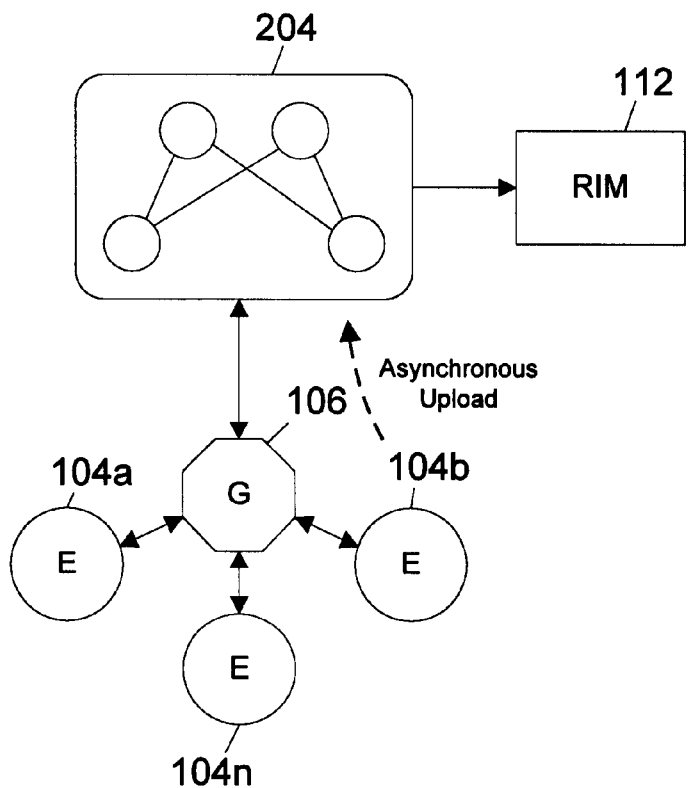

Referring to FIGS. 2A and 2B, diagrams of portions of the distributed data collection mechanism relevant to different phases of the data collection process in accordance with a preferred embodiment of the present invention are illustrated. In the present invention, the "scan" phase of the data collection process is decoupled from the gathering of return results. FIG. 2A illustrates the "scan" phase of the data collection process. In the present invention, each endpoint 104a–104n includes an autonomous scanner, allowing scans to proceed fully parallel. During the "scan" phase, a central "scan initiator" module 202, which may be part of the routing manager, merely performs a profile push to the endpoints 104a–104n without waiting for return data. Some status data may be returned by endpoints 104a–104n to central module 202, but the data to be collected is not returned to central module 202 in response to the profile push.

Instead, as illustrated in FIG. 2B, "return" or collection data (the data being collected) is asynchronously uploaded by individual endpoints 104a–104n to a collection network 204, consisting of collectors associated with endpoints 104a–104n, which routes the data to RIM 112. Transfer of the collection data is thus initiated by the endpoints 104a–104n rather than a centralized module 202. Stated differently, the actual data collection is initiated from the bottom up rather than from the top down.

The profile pushes from central module 202 are infrequent, needed only to set or change the scanner configuration at endpoints 104a–104n. Scanners may be set to run automatically on a daily/weekly schedule or on some other schedule, or in response to an event (including a synchronous scan request from the user), or on boot-up. Scan data is subsequently queued for asynchronous collection.

In its simplest form, collection network 204 may simply be an upcall-collector at each gateway 106 within the distributed data collection mechanism 102, with uploads from endpoints 104a–104n routed from the gateway 106 directly to the RIM 112. However, this implementation may result in a potentially large load on gateway 106. For a gateway 106 servicing 1,000 endpoints 104a–104n, each generating 50K of collection data, the total load on gateway 106 will be 50MB. Data collection in this case will be competing with data distributions on gateway 106 in which data is flowing downstream.

Another drawback with this implementation is that gateways are not generally RIM hosts, which means that unless a custom RIM method is implemented, data flowing from gateway 106 to RIM 112 will be based on CORBA method parameters. Furthermore, wire-transfer overhead is potentially added to the RIM write, in addition to RIM latency. This implementation also provided less control over return data path and less coordination between RIM writers.

A more scalable solution is provided where collection network 204 is implemented with a configurable topology, using collectors nodes instead of simple upcall-collectors as basic elements. Collector nodes can be connected together to form a collection network topology, and can provide additional functionality such as depoting (caching), bandwidth control, and transfer scheduling. Deployment of collector nodes is controlled by the customer, so that the user may choose a simple topology if that is sufficient or, for larger deployments, add additional managed collector nodes to the topology to scale up the amount of data which can be buffered and improve response time visible to endpoints 104a–104n for queuing collection requests. Since collector nodes are not hard coded to gateways, application-specific topology customization becomes possible for, e.g., strategic placement of destination collectors on the RIM host for inventory so that wire-transfer overhead in the RIM object call is eliminated.

Each collector within collection network 204 has a list of endpoints 104a–104n and other collectors with which it may communicate, with the list being maintained by the routing manager. In uploads to a higher collector, each collector behaves substantially like endpoints 104a–104n.

Figure 3:
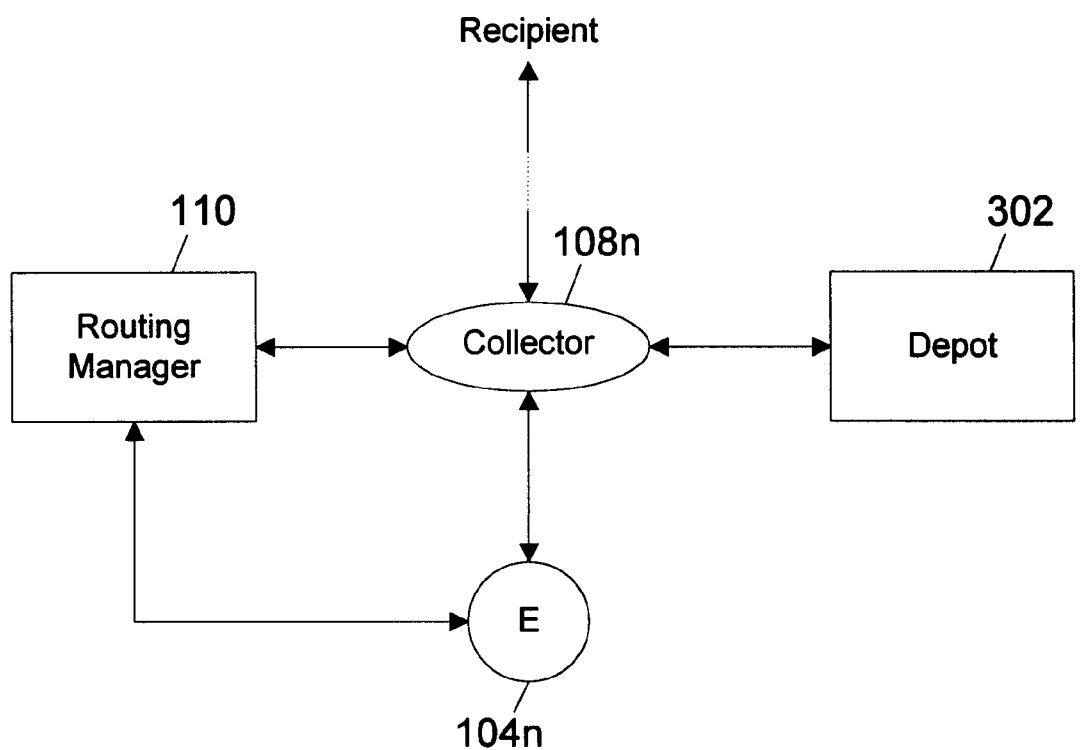
FIG. 3 is a diagram of components of a distributed data collection mechanism employed in a collection process in accordance with a preferred embodiment of the present invention.

With reference now to FIG. 3, a diagram of components of a distributed data collection mechanism employed in a collection process in accordance with a preferred embodiment of the present invention is depicted. A "collection," or an upload of return/collection data from a source towards a recipient, is initiated by endpoint 104n. Whenever endpoint 104n wishes to initiate a collection, endpoint 104n contacts the routing manager 110 to which it is assigned to determine the nearest available collector 108n. Routing manager 110 can determine the location of the nearest available collector 108n, which may take into account the priority of the collection, the utilization of the network by other processes, the availability of endpoint 104n.

Endpoint 104n then initiates a collection by transmitting to the collector 108n a Collection Table of Contents (CTOC), a data structure including information about the collection such as source, recipient, priority, time window, and collection identifier (once assigned). The first time a CTOC is submitted to a collector 108n, the CTOC will receive a unique collection identifier utilized to track the progress of the collection in the network.

Upon receiving the CTOC from endpoint 104n, the collector 108n will queue the CTOC for handling. When collector 108n is ready to receive the collection data (based on factors such as current time, current load, available depot space, and available threads), collector 108n initiates and upload by informing endpoint 104n that it (collector 108n) is ready. Upon receipt of this ready message, endpoint 104n begins transmitting the collection data to collector 108n in small packets, which collector 108n stores in persistent storage (depot 302).

Once the collection data received from endpoint 104n has all been stored by collector 108n, collector 108n sends a message containing the CTOC to either another collector or the recipient. The collection data remains within collector 108n until requested by a higher level collector or the recipient. Once the upstream collector or recipient is ready to receive the collection data, collector 108n transfers the collection data in the same manner in which it collected the data from endpoint 104n or a downstream collector.

If a collection is broken off in the middle of receiving the collection data, collector 108n attempts to receive the remaining data after a short duration, employing a checkpoint restart from the point at which the collection was interrupted. The sender of the data does not delete any part of the collection data until the entire collection data has been successfully transferred upstream.

Upload of collection data to collectors may be managed to control network loading, and may cooperate with other distributed applications to conserve bandwidth utilization while optimizing the amount of bandwidth employed for collection. If there exists a critical section of the network where collection needs to be controlled, a collector may be placed at the end where data is being received. That collector may then be "turned off" or prohibited from transmitting a ready message to an endpoint or downstream collector during certain blackout periods to disable collection. The network may thus impose restrictions on when data may be transferred across certain critical network facilities in order to conserve bandwidth usage.

Figure 4A:
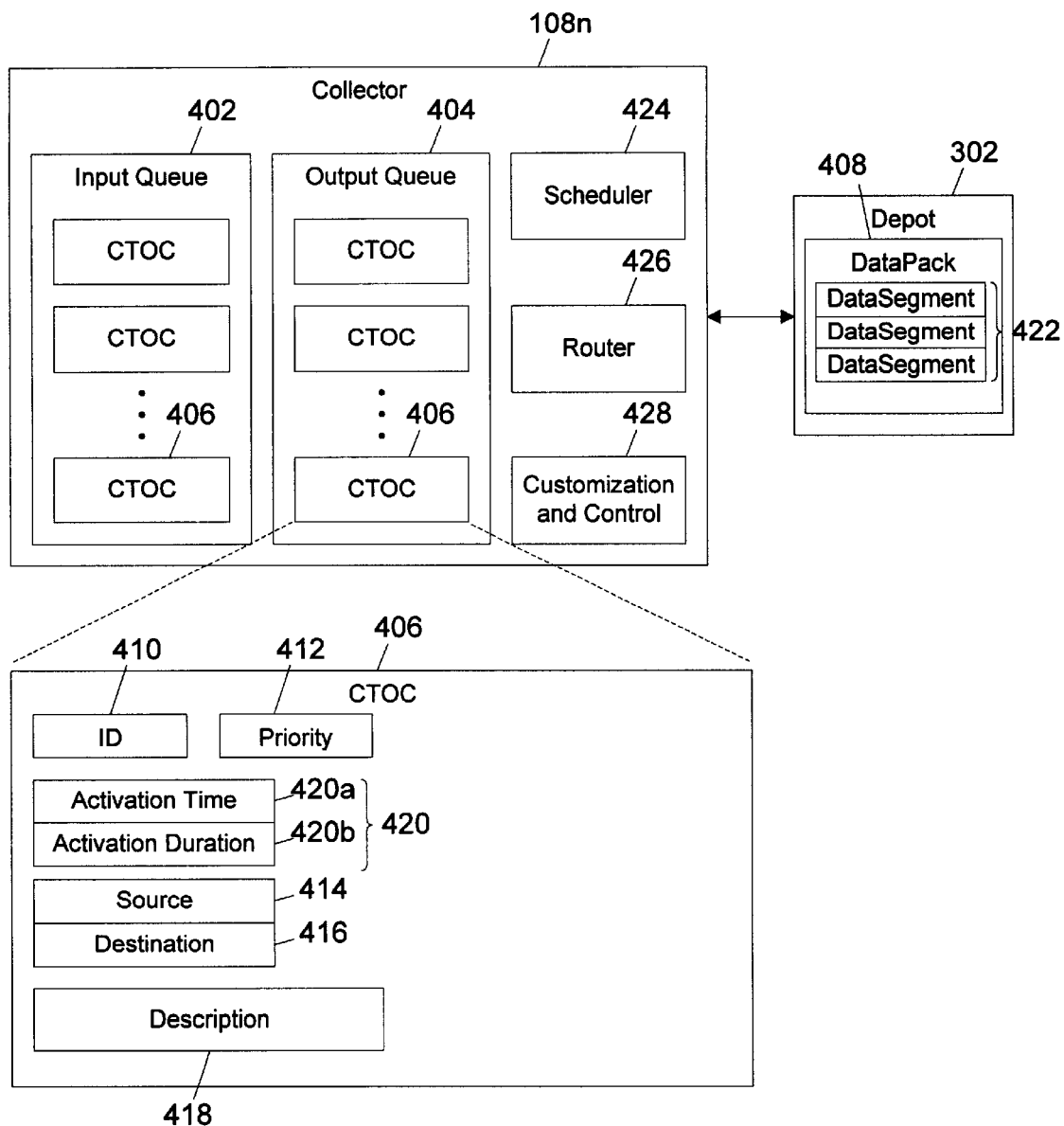
FIGS. 4A–4B are diagrams of a collector and a collector scheduler in accordance with a preferred embodiment of the present invention.
Figure 4B:
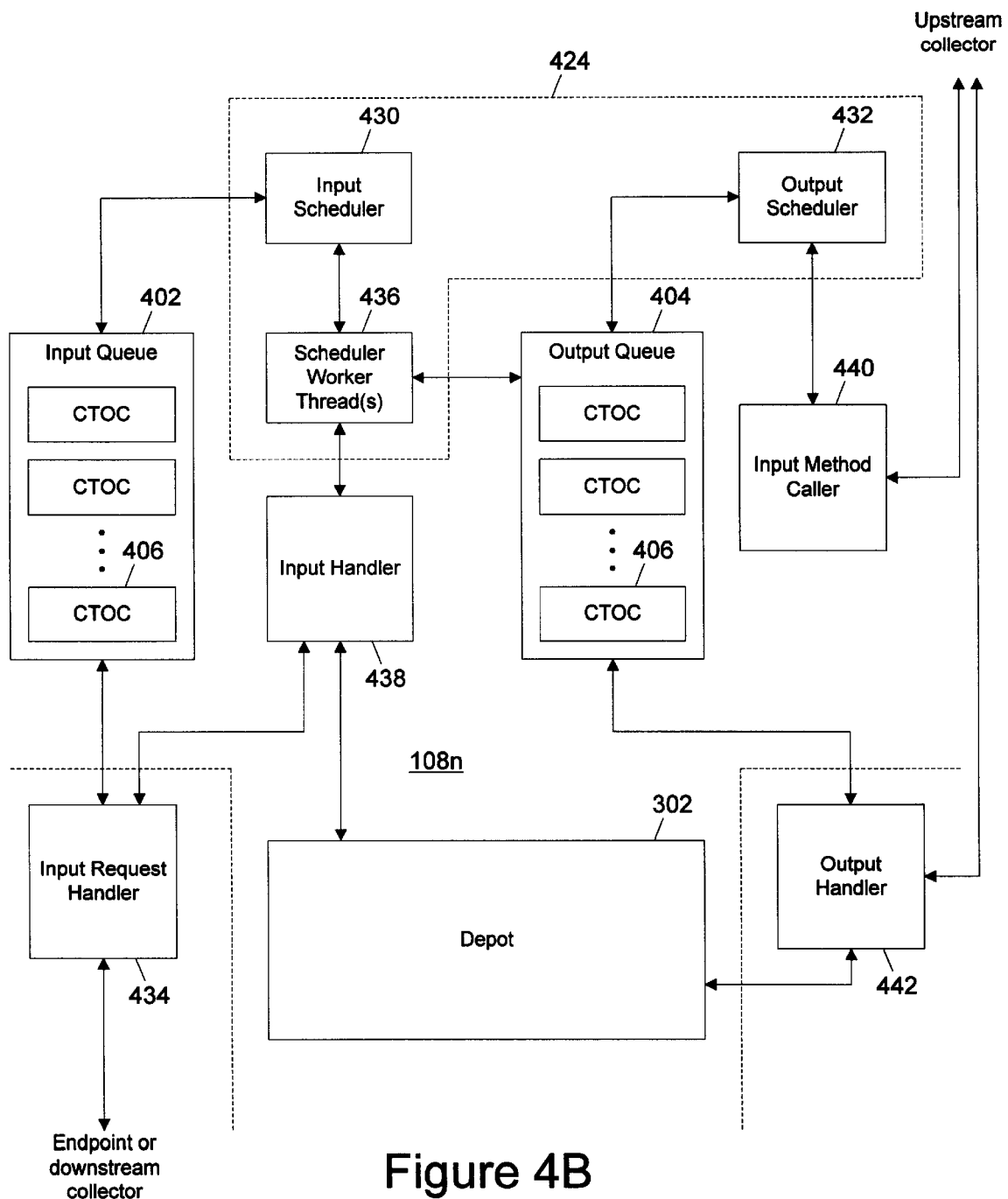

Referring to FIGS. 4A and 4B, diagrams of a collector and a collector scheduler in accordance with a preferred embodiment of the present invention is illustrated. The collector, shown in FIG. 4A, is a fundamental element of the distributed data collection service of the present invention, and is responsible for storing and forwarding collected data towards the eventual destination. The collector is a mid-level management object having one instance per host, and providing priority-based queuing of collection requests, depoting of collection data, a crash recovery mechanism for collection data transfers, and multi-threaded transfer scheduling of collection requests in the queues.

Collectors may be connected into a collection network and deployed into a distributed hierarchical network topology to implement a distributed data collection service, a distribution which may be performed either manually or through some network-loading-based algorithm. Collectors in a collection network have topological relationships utilized to control the routing of data from an "injection" point (endpoint interface to collector) in the collection network to the final destination. Route calculations from endpoints to the recipients via particular collectors may be performed either at each collector, or on a global basis, to marshal collection data towards the eventual destination. These route calculations may be based on a static routing map or one that is dynamically evaluated based on network loading.

Each collector 108n includes a priority-based queuing mechanism which initially includes two queues: an input queue 402 to store requests for collection from downstream nodes (endpoints or lower level collectors) and an output queue 404 to hole collection requests which were spooled to upstream collectors for pickup. Queues 402 and 404 are maintained in sorted order with the primary sort key being the CTOC priority, which ranges, for example, from priority level 0 up to priority level 4.

The priority level may be utilized, for instance, in differentiating between collection from mobile endpoints or other endpoints which are intermittently unavailable (e.g., shut down) and collection from continuously available endpoints. A highest level priority may be assigned to CTOCs originating from mobile endpoints to ensure timely collection of the data while the endpoint is available. Lower level priorities may be assigned to collection data from endpoints which are continuously available.

For mobile and intermittently connected endpoints, the activation time and activation duration information may be utilized to inform collectors of the mobile status of the endpoints, and the expected times that a connection would be available for data pickup. These mobile endpoints would also set a high priority on the collection request, since they have a limited availability window on the network. The collector handling the request would then use the priority to schedule this data pickup ahead of other normal endpoints occurring at the same time.

The secondary sort key within a given priority level is the CTOC's activation time—that is, the time at which the node is available for servicing data transfer requests. The tertiary sort key within a given priority level and a given pickup time is the activation duration for which the node is available to service data transfer requests. Alternatively, additional sorting beyond the primary sort may be applied by providing function hooks.

Queues 402 and 404 essentially store CTOC elements, and can be checkpointed and restarted from a disk file to allow crash recovery of the collection service and the user data for which transfer was in progress. Checkpoint-restart of queues 402 and 404 utilizes Interface Definition Language (IDL) serialization to write and read ASN.1/BER streams to and from the disk. Queues 402 and 404 are preferably thread-safe implementations, as is a retry queue (not shown) if needed.

The data representations employed by collector 108n are implementing in accordance with the key-value pairs approach to store and retrieve data by name, and with backwards binary compatibility from an IDL standpoint. The primary and essential data representations employed are the CTOC 406 and the data pack 408. These data representations possess persistence properties as well as the ability to cross system and process boundaries, and may be implemented in IDL or EIDL.

CTOC 406 forms the "header" portion of collection data, which is utilized by both data-generation endpoints and intermediate collector nodes in the collection network to inform upstream nodes of the availability of the data for pickup. CTOC 406 is employed by endpoints and collectors to negotiate data transfer requests.

CTOC 406 contains a unique identifier 410 for system-wide tracking of the progress of the collection data through the collection network, assigned when the CTOC is first submitted by the data-generation endpoint. CTOC 406 also contains a priority 412 associated with the collection data, which may be from level 0 up to level 4 in the exemplary embodiment.

CTOC 406 also includes source and destination object identifiers 414 and 416 for routing the collection data, and a DataPack component 418 which describes the actual data by, e.g., size and location of files, data compression information, if any, and data encryption information, if any. CTOC 406 also contains an activation time window 420, a "window of opportunity" when the node is available for servicing data transfer request.

Activation time window 420 is encoded in two fields: an activation time field 420a which specifies the earliest time at which the node is available to service data transfer requests; and an activation duration field 420b which places a limit on how long the node will be available to service data transfer requests, starting from the activation time. The activation time window 420 may be employed both for bandwidth utilization control on the collection network and for handling endpoints, such as mobile systems, which are only intermittently connected to the collection network.

The other essential data representation employed by collector 108n is data pack 408, which is the "data" part of the collection dataset and which, together with constituent data segments 422, contains an encoded form of the actual collection data for pickup and delivery. Data pack 408 represents the atomic unit for collection data. A data pack 408 may contain multiple data segments 422 each corresponding to a file and containing, for example, the file path, the file name, and the file attributes such as compression flags, checksums, and encryption information. Data packs 408 and data segments 422 are designed to model arbitrary collections of data, file-based or otherwise.

Collector 108n also includes or employs other components. The persistent storage or "depot" 302 accessible to collector 108n provides intermediate staging of the collection data while in transit, which offers two benefits: first, the data transmission cycle may be spread out more evenly, allowing better bandwidth utilization management of the collection network as well as reducing the instantaneous loading on the end application (the recipient) and thereby increasing scalability; and, second, reliability is increased since the data can now take advantage of crash recovery mechanisms available in the collection service.

Collection data in the form of data packs 408 and data segments 422 are stored on disk within depot 302. Depot 302 maintains an indexed archive of data packs 408 on disk, indexed utilizing the CTOC identifier 410 for the collection data. Depot 302 also implements thread-safety and crash-recovery mechanisms.

Collector 108n also includes a scheduler 424, an active agent which manages the queues 402 and 404 and depot 302. Scheduler 424 services CTOCs 406 from input queue 402, stores and retrieves collection data from depot 302, and propagates collection data upstream to the next collector node.

Scheduler 424 is a multi-threaded implementation which employs socket-based Inter-Object Message (IOM) channels for actual transmission of collection data, with network-bandwidth control mechanisms to regulate flow. Scheduler 424 also employs IOM to transfer data from downstream nodes to the local depot 302. Locally resident CTOCs 406 are then routed by scheduler 424 to the next upstream collector and placed in output queue 404 until the collection data is picked up.

Collector 108n also includes a router 426 which consults the topology management daemon (routing manager) and performs calculations based on the source and recipient identifiers 414 and 416 necessary to determine the next upstream collector node within the collection network for the CTOC. The collection or routing manager 110 maintains a graph-based representation of the collection network, in which collectors are modelled as nodes in the graph and permitted connections are represented by weighted edges. This representation is employed to calculate the optimum path for data and in each hop calculation. Multiple collection managers may exist in the enterprise, with one collection manager per region for multiple regions. Data crossing regions boundaries will do so along WAN-entry points which may be specified to the collection managers. Router 426 may cache frequently utilized routes to minimize network traffic.

Router 426 also optimizes transmission of the collection data to the next upstream node for bandwidth utilization by controlling the activation time and duration fields 420a–420b in the CTOC 406. An alternative, which may be implemented either in lieu of or in addition to the activation time window, is to provide more coarse grain control by specifying, for each collector, a list of endpoints from which that collector may NOT collect data, with each entry specifying either an individual node or a group of nodes. When a CTOC arrives from a node specified within the list, the collector defers collection indefinitely. Any external scheduling mechanism may then be utilized with this mechanism to control, in coarse grain fashion, which of the nodes is to be blocked or blacked out. At the extremes, none or all of the nodes may be blocked.

Finally, collector 108n includes a customization and control module 428 to support status monitoring and the ability to stop any particular collector in the collection network and drain its queues. Also provided are mechanisms which help construct a topology view of the collection network in a graphical fashion, with state and control information for individual collectors. This feature is utilized by administrators to monitor and fine-tune the collection network. Additional hooks may be provided within collector 108n to permit other distributed applications to utilize collection services.

The logical piece identified as scheduler 424, shown in greater detail with other relevant portions of collector 108n in FIG. 4B, is actually two distinct pieces which share functionality but have unique qualities: input scheduler 430 and output scheduler 432. Input scheduler 430 handles the requests for data transfer by endpoints or downstream collectors through successful storage of the collection data within the collector's depot. Output scheduler 432 handles transfer of the collection data from the collector's depot to the upstream collector.

On the input side, an input request handler 434 associated with collector 108n provides an IDL method which will accept upcalls from endpoints or method calls from a downstream collector. The CTOC received from the endpoint or downstream collector by input request handler 434 is placed in input queue 402. If input scheduler 430 has not yet been initiated, the placement of a CTOC within input queue 402 will start up input scheduler 430.

Input scheduler 430 controls the flow of CTOCs from input queue 402 to output queue 404. Input scheduler 430 is a thread which gets initiated after input request handler 434 places the first CTOC within input queue 402. In operation, input scheduler 434 finds the next waiting CTOC to be scheduled and, if a worker thread is available, will set the CTOC to the working state within input queue 402 and spawn a scheduler worker thread 436 to call the application programming interfaces (APIs) of input handler 438 with that CTOC. Input handler 438 will then transfer the data pack(s) and data segement(s) associated with the CTOC into the collector's depot 302. Input handler 438 is a routine for getting the IOM key and sending the key to the lower collector object to open the IOM channel. Input handler 438 is implemented with a set of APIs which input scheduler 430 and depot 302 can call to initiate data transfer.

When the data transfer to depot 302 is finished, the worker thread 436 will return a success or error condition to the calling method of input scheduler 430. On error, the CTOC is placed back into the input queue 402 with an increased retry count. On success, the input scheduler puts the CTOC in output queue 404 and removes that CTOC from input queue 402.

Output scheduler 432 controls the flow of the CTOC from output queue 404 to the next (upstream) collector. Output scheduler 432 is a thread which is initiated after input scheduler 430 places the first CTOC entry in output queue 404. In operation, output scheduler 432 finds the next waiting CTOC within output queue 404 and uses input method caller 440 to call the upstream collector or method to inform it that a CTOC is ready to be sent, setting the state of the CTOC within output queue 404 to working. Output scheduler 432 then goes back into the loop waiting for another ready CTOC to be placed in output queue 404. Unlike input scheduler 430, however, output scheduler 432 will never remove a CTOC from output queue 404 and generate an error based on the retry count, or else the collector 108n will permanently lose data.

Input method caller 440 determines whether the next upstream collector is identified in local memory and, if not, contacts the router to get the next upstream collector object identifier (OID). Input method caller 440 then contacts the upstream collector to inform it that collector 108n is ready to send data upstream.

Output scheduler 432 includes a get_data method called by the upstream collector when the upstream collector is ready for the collection data. Output scheduler 432 must check for available thread and spawn a new worker thread for itself, if there are some available, and return success or failure. The worker thread utilizes APIs in output handler 442 to establish the IOM channel and transfer data from depot 302 in collector 108n to the upstream collector. After completion of the collection data transfer, output scheduler 432 calls output queue 404 and removes the CTOC if the transfer was successful. If the collection data transfer failed, the retry count within the CTOC gets increase and the CTOC is placed back into the waiting state in output queue 404.

Figure 5A:
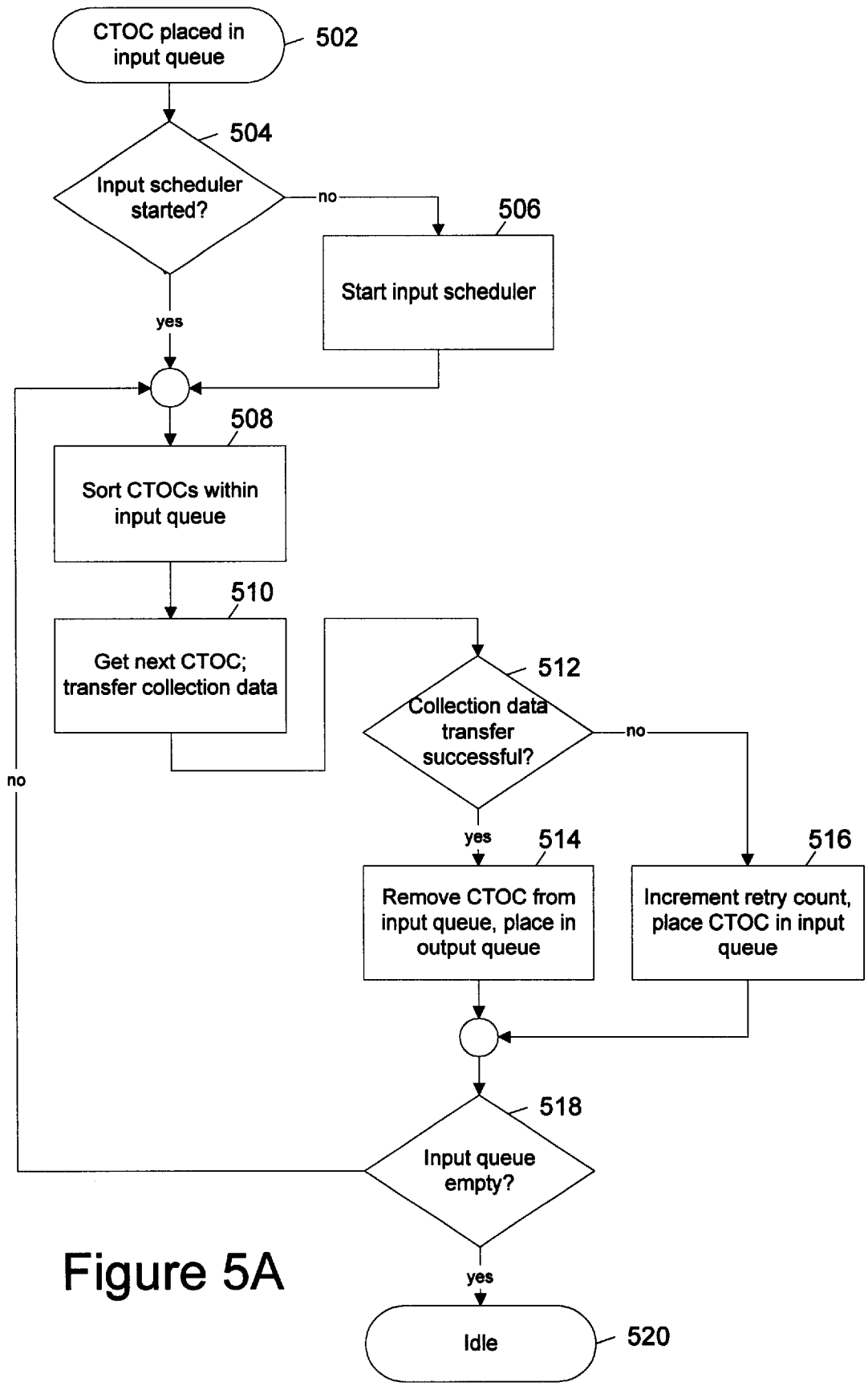
FIG. 5A depicts a high level flow chart for a process of employing a collector scheduler within a distributed collection process in accordance with a preferred embodiment of the present invention.
Figure 5B:
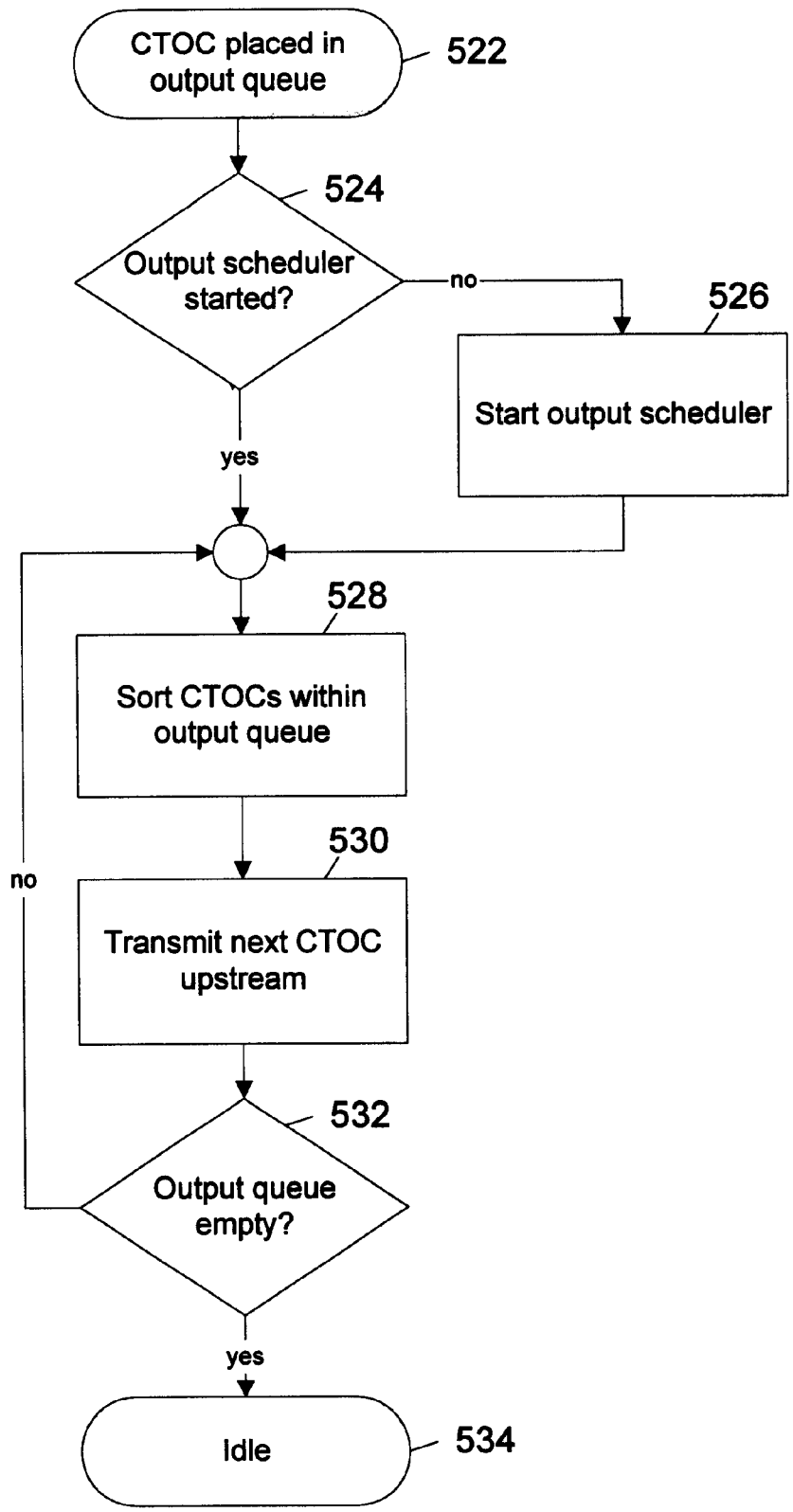
FIG. 5B is a diagram of a distributed data collection mechanism in accordance with the known art.

With reference now to FIGS. 5A and 5B, high level flow charts for processes of employing a collector scheduler within a distributed collection process in accordance with a preferred embodiment of the present invention are depicted. FIG. 5A depicts a process employed by the input scheduler. For simplicity, a single threaded process is illustrated, although the input scheduler preferably employs a multi-threaded process.

The process of FIG. 5A begins with step 502, which depicts a CTOC being placed in the input queue after being received from an endpoint or downstream collector. For multi-threaded implementations, the CTOC is placed in the input queue in the "waiting" state, indicating that the CTOC is awaiting service, as opposed to the "working" state, which indicates that the corresponding collection data is being transferred. The process then passes to step 504, which illustrates a determination of whether the input scheduler has previously been started. If not, the process proceeds to step 506, which depicts starting the input scheduler.

If the input scheduler had been previously started, or once the input scheduler is started, the process proceeds from step 504 or 506 to step 508, which illustrates sorting the (waiting) CTOCs within the input queue. Although the sorting may actually be performed by the input queue rather than the input scheduler, the sorting comprises part of the scheduling process since the sort order determines which CTOC is "next." CTOCs within the input queue are preferably sorted first by priority, and second by activation time window.

The process next passes to step 510, which depicts the input scheduler getting the next CTOC and initiating transfer of the corresponding collection data. For multi-threaded processes, data collection transfers may be performed in parallel up to a number of available worker threads, as long as CTOCs remaining waiting in the input queue. The transferred collection data is stored within the depot for the collector.

The process then passes to step 512, which illustrates a determination of whether the collection data transfer was successfully completed. If so, the process proceeds to step 514, which depicts removing the corresponding CTOC from the input queue and placing it within the output queue. If the collection data transfer was not successfully completed, however, the process proceeds instead to step 516, which illustrates incrementing a retry count within the CTOC and placing the CTOC back into the input queue (in the waiting state, for multi-threaded implementations). Transfer of the associated collection data will then be reattempted.

From either of steps 514 or 516, the process passes to step 518, which illustrates a determination of whether there are any other (waiting) CTOCs remaining within the input queue. If so (i.e., the input queue is not empty), the process returns to step 508 and the data collection process is repeated with the new CTOC. If not, however, the process proceeds instead to step 520, which illustrates the process becoming idle until another CTOC is place in the input queue.

FIG. 5B depicts the process employed by the output scheduler, which is also depicted as a single-threaded process for simplicity. The process of FIG. 5B begins with step 522, which depicts a CTOC being placed in the output queue by the input scheduler. Again, for multi-threaded implementations, the CTOC is placed in the input queue in the "waiting" state. The process then passes to step 524, which illustrates a determination of whether the output scheduler has previously been started. If not, the process proceeds to step 526, which depicts starting the output scheduler.

If the output scheduler had been previously started, or once the output scheduler is started, the process proceeds from step 524 or 526 to step 528, which illustrates sorting the (waiting) CTOCs within the output queue. This sorting also comprises part of the scheduling process although it may actually be performed by the output queue rather than the output scheduler, since the sort order determines which CTOC is "next." CTOCs within the output queue are also preferably sorted primarily based upon priority and secondarily based upon activation time window.

The process next passes to step 530, which depicts the output scheduler getting the next CTOC and transmitting it to the upstream collector. For multi-threaded processes, several CTOCs may be transmitted to upstream collectors in parallel, up to a number of available worker threads. The process then passes to step 532, which illustrates a determination of whether there are any other (waiting) CTOCs remaining within the output queue. If so (i.e., the output queue is not empty), the process returns to step 528 and the the next CTOC is transmitted upstream. If not, however, the process proceeds instead to step 534, which illustrates the process becoming idle until another CTOC is place in the output queue.

In the present invention, scheduling of data collection for a collector within a distributed data collection process is performed based on local conditions, without direct global control or management. Global management of the distributed data collection process is only achieved indirectly by profile pushes to autonomous scanners within the endpoints. By not attempting global scheduling, the scheduling task is simplified.

Scheduling is also bifurcated for the input queue and output queue of a collector. This allows simpler logic to be implemented for the scheduler and permits the scheduling processes to run independent for both queues. For example, the input scheduler may be stopped in response to, say, a disk full error condition, while the output scheduler is permitted to continue uninterrupted. Scheduling is even further localized since the input and output schedulers schedule data transfers or CTOCs based only the contents of the input or output queues, respectively, and the downstream or upstream loading conditions, respectively. Different functionality for the input and output scheduler may also be implemented, as in the case of the retry count exceeding a maximum limit.

The present invention provides an asynchronous collection mechanism in which data collection is controlled by the individual collector. Data is transferred utilizing a direct channel and is stored in depots established to hold collected data. The data collection mechanism allows checkpoint restarts, blackout windows, and bandwidth utilization control.

The present invention may be utilized in a distributed collection network in which the topology is configurable and may be dynamically modified at run time based on loading conditions by specifying routing for particular packets of collection data according to regional traffic on all alternative paths between the source and recipient. Data collection autonomously originates with data generation endpoints and is asynchronously timed, within an activation window specified by the endpoints, based on local conditions within an upstream collector for a next immediate hop. Scheduling of collection data hops is performed locally without global timing constraints.

The present invention is well-suited for data collection from mobile endpoints. The user of the mobile endpoint may trigger an autonomous scan for collection data within the mobile endpoitn by logging on to a network. The mobile system formulates a CTOC for the collection data, specifying an activation window with, perhaps, some input from the user regarding how long the user intends to remain logged onto the network. The priority for the CTOC may also be set based on whether the endpoint is mobile and/or intermittently unavailable or always on and always connected. The routing for the next data hop is optimized by a central collection routing manager for local traffic and available alternative paths to the intended recipient, but scheduling is based on local conditions without global timing controls.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of scheduling distributed data collection, comprising:

scheduling data collection for a collector from an endpoint or downstream collector based on contents of an input queue for the collector, wherein the input queue contains data structures corresponding to all collection data available at an endpoint or downstream collector for transfer by the collector; and responsive to transfer of collection data from an endpoint or downstream collector to the collector, notifying an upstream collector of availability of the collection data at the collector.

2. The method of claim 1, wherein the step of notifying an upstream collector of availability of the collection data at the collector further comprises:

setting an activation time window within a data structure corresponding to the collection data.

3. The method of claim 2, further comprising:

utilizing the activation time window to define black out periods for a node containing the collector.

4. The method of claim 2, further comprising:

utilizing the activation time window for bandwidth utilization control and to handle endpoints intermittently available for data collection.

5. The method of claim 1, further comprising:

providing a customization and control module within the collector to support status monitoring and the ability to stop the collector and drain queues within the collector.

6. The method of claim 1, further comprising:

providing a graphical topological view of a collection network including the collector for monitoring the collection network.

7. The method of claim 1, wherein the step of scheduling data collection for a collector from an endpoint or downstream collector based on contents of an input queue for the collector further comprises:

scheduling the data collection based on local queues, independent global timing control.

8. The method of claim 1, wherein the step of scheduling data collection for a collector from an endpoint or downstream collector based on contents of an input queue for the collector further comprises:

scheduling the data collection based on separate input and output queues, wherein the input queue is utilized for data collection from a downstream endpoint or collector and the output queue is utilized for data transfer to an upstream collector or recipient.

9. A method of scheduling distributed data collection, comprising:

receiving a data structure indicating that collection data is available at an endpoint or downstream collector;

placing the data structure within an input queue for a collector receiving the data structure;

sorting the data structure and any other data structures within the input queue based on preselected attributes of the data structures;

responsive to resources at an upstream collector for transferring the collection data becoming available, selecting a next data structure from the sorted data structures within the input queue;

responsive to successful transfer of the collection data, removing the data structure from the input queue and placing the data structure in an output queue for the collector.

10. The method of claim 9, further comprising:

providing the collector with a plurality of modes of operation, wherein a first mode of operation, corresponding to a first priority level within a collection table of contents data structure for collection data, is employed for collecting data from mobile endpoints, and wherein a second mode of operation, corresponding to a second priority level within the collection table of contents data structure for collection data, is employed for collecting data from continuously available endpoints.

11. A system for scheduling distributed data collection, comprising:

an input queue containing data structures corresponding to all collection data available at an endpoint or downstream collector for transfer by a collector;

a scheduler scheduling data collection by the collector from an endpoint or downstream collector based on contents of the input queue for the collector; and signal means, responsive to transfer of collection data from an endpoint or downstream collector to the collector, for notifying an upstream collector of availability of the collection data at the collector.

12. The system of claim 11, wherein the signal means for notifying an upstream collector of availability of the collection data at the collector further comprises:

means for setting an activation time window within a data structure corresponding to the collection data.

13. The system of claim 12, further comprising:

means for utilizing the activation time window to define black out periods for a node containing the collector.

14. The system of claim 12, further comprising:

means for utilizing the activation time window for bandwidth utilization control and to handle endpoints intermittently available for data collection.

15. The system of claim 11, further comprising:

means for providing a customization and control module within the collector to support status monitoring and the ability to stop the collector and drain queues within the collector.

16. The system of claim 11, further comprising:

means for providing a graphical topological view of a collection network including the collector for monitoring the collection network.

17. The system of claim 11, wherein the scheduler further comprises:

means for scheduling the data collection based on local queues, independent global timing control.

18. The system of claim 11, wherein the sscheduler further comprises:

means for scheduling the data collection based on separate input and output queues, wherein the input queue is utilized for data collection from a downstream endpoint or collector and the output queue is utilized for data transfer to an upstream collector or recipient.

19. A system for scheduling distributed data collection, comprising:

means for receiving a data structure indicating that collection data is available at an endpoint or downstream collector;

means for placing the data structure within an input queue for a collector receiving the data structure;

means for sorting the data structure and any other data structures within the input queue based on preselected attributes of the data structures;

means, responsive to resources at an upstream collector for transferring the collection data becoming available, for selecting a next data structure from the sorted data structures within the input queue;

means, responsive to successful transfer of the collection data, for removing the data structure from the input queue and placing the data structure in an output queue for the collector.

20. The system of claim 19, further comprising:

means for providing the collector with a plurality of modes of operation, wherein a first mode of operation, corresponding to a first priority level within a collection table of contents data structure for collection data, is employed for collecting data from mobile endpoints, and wherein a second mode of operation, corresponding to a second priority level within the collection table of contents data structure for collection data, is employed for collecting data from continuously available endpoints.

21. A computer program product within a computer usable medium for scheduling distributed data collection, comprising:

instructions for scheduling data collection for a collector from an endpoint or downstream collector based on contents of an input queue for the collector, wherein the input queue contains data structures corresponding to all collection data available at an endpoint or downstream collector for transfer by the collector; and instructions, responsive to transfer of collection data from an endpoint or downstream collector to the collector, for notifying an upstream collector of availability of the collection data at the collector.

22. The computer program product of claim 11, wherein the instructions for notifying an upstream collector of availability of the collection data at the collector further comprises:

instructions for setting an activation time window within a data structure corresponding to the collection data.

23. The computer program product of claim 22, further comprising:
instructions for utilizing the activation time window to define black out periods for a node containing the collector.

24. The computer program product of claim 22, further comprising:
instructions for utilizing the activation time window for bandwidth utilization control and to handle endpoints intermittently available for data collection.

25. The computer program product of claim 21, further comprising:
instructions for providing a customization and control module within the collector to support status monitoring and the ability to stop the collector and drain queues within the collector.

26. The computer program product of claim 21, further comprising:
instructions for providing a graphical topological view of a collection network including the collector for monitoring the collection network.

27. The computer program product of claim 21, wherein the instructions for scheduling data collection for a collector from an endpoint or downstream collector based on contents of an input queue for the collector further comprise:
instructions for scheduling the data collection based on local queues, independent global timing control.

28. The computer program product of claim 21, wherein the instructions for scheduling data collection for a collector from an endpoint or downstream collector based on contents of an input queue for the collector further comprise:
instructions for scheduling the data collection based on separate input and output queues, wherein the input queue is utilized for data collection from a downstream endpoint or collector and the output queue is utilized for data transfer to an upstream collector or recipient.

29. A computer program product within a computer usable medium for scheduling distributed data collection, comprising:
instructions for receiving a data structure indicating that collection data is available at an endpoint or downstream collector;
instructions for placing the data structure within an input queue for a collector receiving the data structure;
instructions for sorting the data structure and any other data structures within the input queue based on preselected attributes of the data structures;
instructions, responsive to resources at an upstream collector for transferring the collection data becoming available, for selecting a next data structure from the sorted data structures within the input queue;
instructions, responsive to successful transfer of the collection data, for removing the data structure from the input queue and placing the data structure in an output queue for the collector.

30. The computer program product of claim 29, further comprising:
instructions for providing the collector with a plurality of modes of operation,
wherein a first mode of operation, corresponding to a first priority level within a collection table of contents data structure for collection data, is employed for collecting data from mobile endpoints, and
wherein a second mode of operation, corresponding to a second priority level within the collection table of contents data structure for collection data, is employed for collecting data from continuously available endpoints.

* * * * *